(12) United States Patent
Okui et al.

(10) Patent No.: US 10,858,996 B2
(45) Date of Patent: Dec. 8, 2020

(54) GAS TURBINE STARTUP METHOD AND DEVICE

(71) Applicant: MITSUBISHI HITACHI POWER SYSTEMS, LTD., Kanagawa (JP)

(72) Inventors: Hidetaka Okui, Kanagawa (JP); Kentaro Suzuki, Kanagawa (JP); Toshishige Ai, Kanagawa (JP); Tatsuya Iwasaki, Kanagawa (JP); Yoshifumi Okajima, Tokyo (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 234 days.

(21) Appl. No.: 15/576,873

(22) PCT Filed: Oct. 26, 2016

(86) PCT No.: PCT/JP2016/081759
§ 371 (c)(1),
(2) Date: Nov. 27, 2017

(87) PCT Pub. No.: WO2017/077921
PCT Pub. Date: May 11, 2017

(65) Prior Publication Data
US 2018/0171875 A1    Jun. 21, 2018

(30) Foreign Application Priority Data
Nov. 4, 2015    (JP) .................... 2015-216841

(51) Int. Cl.
*F02C 9/18* (2006.01)
*F02C 7/18* (2006.01)
*F02C 7/26* (2006.01)

(52) U.S. Cl.
CPC ............... *F02C 7/18* (2013.01); *F02C 7/26* (2013.01); *F02C 9/18* (2013.01); *F05D 2260/85* (2013.01)

(58) Field of Classification Search
CPC ....... F02C 6/08; F02C 7/18; F02C 7/26; F02C 7/264; F02C 7/268; F02C 7/27;
(Continued)

(56) References Cited

U.S. PATENT DOCUMENTS

| 4,060,979 A | 12/1977 | Elsaesser et al. |
| 4,683,715 A | 8/1987 | Iizuka et al. |

(Continued)

FOREIGN PATENT DOCUMENTS

| JP | 56-109630 | 8/1981 |
| JP | 61-142335 | 6/1986 |

(Continued)

OTHER PUBLICATIONS

International Search Report dated Jan. 24, 2017 in International (PCT) Application No. PCT/JP2016/081759.

(Continued)

*Primary Examiner* — William H Rodriguez
(74) *Attorney, Agent, or Firm* — Wenderoth, Lind & Ponack, L.L.P.

(57) ABSTRACT

A gas turbine startup method and device wherein low-pressure, medium-pressure, and high-pressure air bleed flow paths supply compressed air bled from low-pressure, medium-pressure, and high-pressure air bleed chambers, respectively, of a compressor as cooling air to a turbine. Low-pressure, medium-pressure, and high-pressure exhaust flow paths discharge the compressed air in the low-pressure, medium-pressure, and high-pressure air bleed flow paths, respectively to the turbine exhaust system, and the low-pressure, the medium-pressure, and the high-pressure (Continued)

exhaust flow paths are provided respectively with a low-pressure exhaust valve, a medium-pressure exhaust valve, and a high-pressure exhaust valve. When the gas turbine starts up, the high-pressure exhaust valve is opened before the startup state of the gas turbine reaches a region in which rotation stall occurs.

10 Claims, 5 Drawing Sheets

(58) Field of Classification Search
CPC .... F02C 9/18; F02C 7/16; F02C 7/185; F05D 2260/85; F05D 2270/101; F04D 27/02; F04D 27/0207
See application file for complete search history.

(56) References Cited

U.S. PATENT DOCUMENTS

| | | | |
|---|---|---|---|
| 6,328,526 B1 | 12/2001 | Seki et al. | |
| 7,972,105 B2 * | 7/2011 | Dejoris | F02C 9/18 |
| | | | 415/1 |
| 2014/0072399 A1 * | 3/2014 | Maldonado | F01D 25/10 |
| | | | 415/1 |
| 2014/0271110 A1 * | 9/2014 | Tillery | F02C 6/08 |
| | | | 415/1 |
| 2014/0271113 A1 | 9/2014 | Khalid et al. | |
| 2015/0211540 A1 * | 7/2015 | Eleftheriou | F04D 27/023 |
| | | | 415/145 |

FOREIGN PATENT DOCUMENTS

| | | |
|---|---|---|
| JP | 62-126296 | 6/1987 |
| JP | 2000-291449 | 10/2000 |
| JP | 2001-090555 | 4/2001 |
| JP | 2008-196399 | 8/2008 |
| JP | 2010-281224 | 12/2010 |
| JP | 2012-102648 | 5/2012 |
| JP | 2012-207623 | 10/2012 |

OTHER PUBLICATIONS

Written Opinion of the International Searching Authority dated Jan. 24, 2017 in International (PCT) Application No. PCT/JP2016/081759.

* cited by examiner

GAS TURBINE STARTUP METHOD AND DEVICE

TECHNICAL FIELD

The present invention relates to a method and a device for starting up a gas turbine that includes a compressor, a combustor, and a turbine.

BACKGROUND ART

A typical gas turbine is configured by a compressor, a combustor, and a turbine. Air taken in through an air inlet port is compressed by the compressor to produce high-temperature, high-pressure compressed air, to which fuel is supplied and the two are combusted in the combustor to obtain high-temperature, high-pressure combustion gas (operating fluid), which is used to drive the turbine, thereby driving a power generator coupled to the turbine.

When the gas turbine starts up, the rotation of a rotor is driven by a startup motor to drive the compressor in order to secure compressed air. When the compressed air is produced by this compressor, the load on blades increases and revolution stall may occur. In a case where revolution stall occurs, a decreased efficiency, vibration of wings, and vibration of a shaft may occur at the same time.

An example of a method for preventing revolution stall in a gas turbine is disclosed in Patent Document 1 described below. Patent Document 1 discloses a method for starting up a gas turbine that includes opening a valve provided in an air extraction pipe upon startup of the gas turbine to cause compressed air, which has been bled from the air extraction pipe, to be blown on blades or vanes from an injection nozzle. This suppresses an occurrence of a revolution stall upon the startup.

CITATION LIST

Patent Document

Patent Document 1: JP 2012-207623 A

SUMMARY OF INVENTION

Technical Problems

The above-described conventional method for starting up a gas turbine needs the injection nozzle for blowing the compressed air on the blades or the vanes. This makes a structure complicated and increases manufacturing costs.

The present invention has been made in view of the above-described problems, and an object thereof is to provide a method and a device for starting up a gas turbine that can appropriately start up a gas turbine while suppressing an increase in structural complexity and in manufacturing costs.

Solution to Problems

A method for starting up a gas turbine of the present invention for achieving the above-described object is characterized as follows. The gas turbine includes a compressor, a combustor, and a turbine. The gas turbine is provided with: a first air bleed flow path, a second air bleed flow path, and a third air bleed flow path for supplying, as cooling air, compressed air bled from a first air bleed chamber, a second air bleed chamber on a higher pressure side than the first air bleed chamber, and a third air bleed chamber on a higher pressure side than the second air bleed chamber of the compressor to the turbine; a first exhaust flow path, a second exhaust flow path, and a third exhaust flow path for discharging the compressed air in the first air bleed flow path, the second air bleed flow path, and the third air bleed flow path to a turbine exhaust system: and a first exhaust valve, a second exhaust valve, and a third exhaust valve in the first exhaust flow path, the second exhaust flow path, and the third exhaust flow path, respectively. In the method for starting up a gas turbine, when the gas turbine starts up, the third exhaust valve is opened before a startup state of the gas turbine reaches a region in which revolution stall occurs.

Therefore, when the gas turbine starts up, a startup motor drives the compressor to compress air and the compressed air flows to the combustor side, for example. At this time, a load on blades in the compressor increases, and revolution stall may occur. Thus, the third exhaust valve is opened before the startup state of the gas turbine reaches the region in which revolution stall occurs. The compressed air that is bled from the third air bleed chamber and flows through the third air bleed flow path is discharged into the turbine exhaust system through the third exhaust flow path. This reduces the load on the blades and suppresses the occurrence of revolution stall, so that the startup performance of the gas turbine can be improved. As a result, the gas turbine can appropriately start up while suppressing an increase in structural complexity and in manufacturing costs.

In the method for starting up a gas turbine of the present invention, the first air bleed chamber is provided to stages within a range of 30% to 45% from a front stage of the compressor, the second air bleed chamber is provided to stages within a range of 55% to 70% from the front stage, and the third air bleed chamber is provided to stages within a range of 75% to 95% from the front stage.

Therefore, the load on the blades is reduced and the occurrence of revolution stall is suppressed by providing each of the air bleed chambers in an appropriate range of each of the stages in the compressor, so that the startup performance of the gas turbine can be improved.

In the method for starting up a gas turbine of the present invention, when the gas turbine starts up, the first exhaust valve, the second exhaust valve, and the third exhaust valve are opened before the startup state of the gas turbine reaches the region in which revolution stall occurs.

Therefore, upon the startup of the gas turbine, not only the third exhaust valve but also the first exhaust valve and the second exhaust valve are opened before the startup state of the gas turbine reaches the region in which revolution stall occurs. Thus, the load on the blades can be reduced in the entire region of the compressor, and the occurrence of revolution stall is suppressed. This can improve the startup performance of the gas turbine.

In the method for starting up a gas turbine of the present invention, the first exhaust valve, the second exhaust valve, and the third exhaust valve are opened upon the startup of the gas turbine.

The first exhaust valve, the second exhaust valve, and the third exhaust valve being opened upon the startup of the gas turbine eliminates the operation to open valves in the middle of the startup of the gas turbine, and operability can be improved by simplifying the control.

In the method for starting up a gas turbine of the present invention, a degree of opening of the third exhaust valve is set smaller than a degree of opening of the first exhaust valve and the second exhaust valve.

The degree of opening of the third exhaust valve being smaller than the degree of opening of the first exhaust valve and the second exhaust valve can suppress a loss of the compressed air pressurized to high pressure, and a decrease in turbine efficiency.

In the method for starting up a gas turbine of the present invention, the first exhaust valve, the second exhaust valve, and the third exhaust valve are closed after the startup state of the gas turbine passes through the region in which revolution stall occurs.

Each of the exhaust valves being closed after the startup state of the gas turbine passes through the region in which revolution stall occurs can secure a sufficient amount of the compressed air, and therefore a rated operation can be performed in an early stage.

In the method for starting up a gas turbine of the present invention, the third exhaust valve is closed when a rotational speed of the gas turbine reaches a predetermined first rotational speed that is preset.

When the rotational speed of the gas turbine reaches the first rotational speed, the third exhaust valve is first closed. Thus, extraction of the compressed air pressurized to high pressure is stopped, and a rated operation can be performed in an early stage.

In the method for starting up a gas turbine of the present invention, the first exhaust valve is closed when the rotational speed of the gas turbine reaches a predetermined second rotational speed preset higher than the first rotational speed, and the second exhaust valve is closed when the rotational speed of the gas turbine reaches a predetermined third rotational speed preset higher than the second rotational speed.

When the rotational speed of the gas turbine reaches the second rotational speed, the first exhaust valve is then closed. When the rotational speed of the gas turbine reaches the third rotational speed, the second exhaust valve is then closed. Thus, extraction of the compressed air is successively stopped, and a rated operation can be performed in an early stage.

In the method for starting up a gas turbine of the present invention, the degree of opening of the third exhaust valve is reduced when the rotational speed of the gas turbine reaches a predetermined fourth rotational speed preset lower than the first rotational speed, and the third exhaust valve is closed when the rotational speed of the gas turbine reaches the first rotational speed.

When the rotational speed of the gas turbine reaches the fourth rotational speed, the degree of opening of the third exhaust valve is reduced. When the rotational speed of the gas turbine reaches the first rotational speed, the third exhaust valve is closed. Thus, a loss of the compressed air pressurized to high pressure is suppressed, and a decrease in turbine efficiency can be suppressed.

In the method for starting up a gas turbine of the present invention, an upper limit value of the degree of opening of the third exhaust valve upon the startup of the gas turbine is set according to an inlet gas temperature or an outlet gas temperature of the turbine.

The degree of opening of the third exhaust valve being set according to the inlet gas temperature or the outlet gas temperature of the turbine can prevent an increase in temperature to higher than a heatproof temperature in the compressor, and safety can be secured.

In the method for starting up a gas turbine of the present invention, a lower limit value of the degree of opening of the third exhaust valve upon the startup of the gas turbine is set according to pressure of the compressed air in the compressor.

The degree of opening of the third exhaust valve being set according to the pressure of the compressed air can suppress a wasteful loss of compressed air while suppressing the occurrence of revolution stall.

A method for starting up a gas turbine of the present invention is characterized as follows. The gas turbine includes a compressor, a combustor, and a turbine. The gas turbine is provided with: a first air bleed flow path, a second air bleed flow path, and a third air bleed flow path for supplying, as cooling air, compressed air bled from a first air bleed chamber, a second air bleed chamber on a higher pressure side than the first air bleed chamber, and a third air bleed chamber on a higher pressure side than the second air bleed chamber of the compressor to the turbine; a first exhaust flow path, a second exhaust flow path, and a third exhaust flow path for discharging the compressed air in the first air bleed flow path, the second air bleed flow path, and the third air bleed flow path to a turbine exhaust system; and a first exhaust valve, a second exhaust valve, and a third exhaust valve in the first exhaust flow path, the second exhaust flow path, and the third exhaust flow path, respectively. In the method for starting up a gas turbine, a degree of opening of the first exhaust valve, the second exhaust valve, and the third exhaust valve is increased before a startup state of the gas turbine reaches a region in which revolution stall occurs, and the degree of opening of the first exhaust valve, the second exhaust valve, and the third exhaust valve is reduced after the startup state of the gas turbine passes through the region in which revolution stall occurs.

Therefore, when the gas turbine starts up, a startup motor drives the compressor to compress air and the compressed air flows to the combustor side, for example. At this time, a load on blades in the compressor increases, and revolution stall may occur. Thus, the degree of opening of the exhaust valves is increased before the startup state of the gas turbine reaches the region in which revolution stall occurs, and the degree of opening of the exhaust valves is reduced after the startup state of the gas turbine passes through the region in which revolution stall occurs. This reduces the load on the blades and suppresses the occurrence of revolution stall, so that the startup performance of the gas turbine can be improved. As a result, the gas turbine can appropriately start up while suppressing an increase in structural complexity and in manufacturing costs.

A device for starting up a gas turbine of the present invention is characterized as follows. The gas turbine includes a compressor, a combustor, and a turbine. The gas turbine is provided with a first air bleed flow path, a second air bleed flow path, and a third air bleed flow path for supplying, as cooling air, compressed air bled from a first air bleed chamber, a second air bleed chamber, and a third air bleed chamber of the compressor to the turbine. The device includes: a first exhaust flow path, a second exhaust flow path, and a third exhaust flow path for discharging the compressed air in the first air bleed flow path, the second air bleed flow path, and the third air bleed flow path to a turbine exhaust system; a first exhaust valve, a second exhaust valve, and a third exhaust valve in the first exhaust flow path, the second exhaust flow path, and the third exhaust flow path, respectively; and a control device that opens the third exhaust valve before a startup state of the gas turbine reaches a region in which revolution stall occurs when the gas turbine starts up.

Therefore, when the gas turbine starts up, the third exhaust valve is opened before the startup state of the gas turbine reaches the region in which revolution stall occurs. Thus, a load on the blades is reduced and the occurrence of revolution stall is suppressed. This can improve the startup performance of the gas turbine. As a result, the gas turbine can appropriately start up while suppressing an increase in structural complexity and in manufacturing costs.

Advantageous Effects of Invention

According to the method and device for starting up a gas turbine of the present invention, when the gas turbine starts up, an exhaust valve is opened before a startup state of the gas turbine reaches a region in which revolution stall occurs. Thus, the method and device for starting up a gas turbine of the present invention can appropriately start up the gas turbine while suppressing an increase in structural complexity and in manufacturing costs.

DESCRIPTION OF EMBODIMENTS

A method and a device for starting up a gas turbine according to preferred embodiments of the present invention are described in detail below with reference to the attached drawings. Note that the present invention is not limited by these embodiments, and, when there are a plurality of embodiments, includes combinations of those various embodiments.

Figure 1:
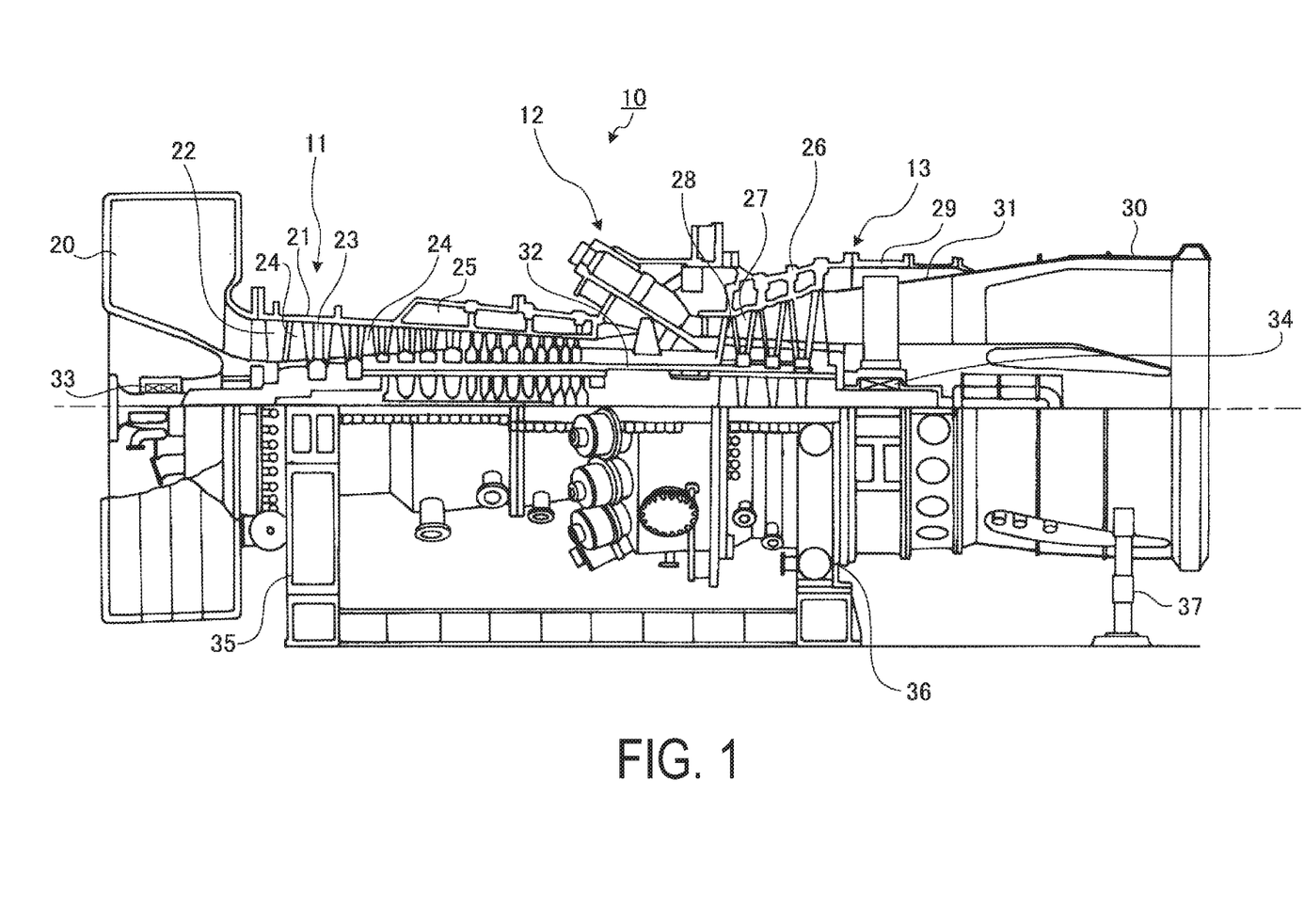
FIG. 1 is a schematic configuration diagram of a gas turbine of the present embodiment.

FIG. 1 is a schematic configuration diagram of a gas turbine of the present embodiment.

As illustrated in FIG. 1, in the present embodiment, a gas turbine 10 includes a compressor 11, a combustor 12, and a turbine 13. The gas turbine 10 is coaxially coupled to a generator not illustrated in the drawings, and is capable of generating power.

The compressor 11 includes an air inlet port 20 for taking in air, an inlet guide vane (IGV) 22 disposed inside a compressor casing 21, a plurality of vanes 23 and blades 24 alternately disposed with respect to the forward/backward direction (the axial direction of a rotor 32 described below) within the compressor casing 21, and an air bleed chamber 25 disposed on the outside of the compressor casing 21. The combustor 12 supplies fuel to compressed air compressed by the compressor 11, and ignites the mixture to allow for combustion. The turbine 13 includes a plurality of vanes 27 and blades 28 alternately disposed with respect to the forward/backward direction (the axial direction of the rotor 32 described below) within a turbine casing 26. An exhaust chamber 30 is disposed downstream of the turbine casing 26 with an exhaust housing 29 disposed therebetween, and the exhaust chamber 30 includes an exhaust diffuser 31 connected to the turbine 13.

The rotor (rotating shaft) 32 is positioned so as to pass through the centers of the compressor 11, the combustor 12, the turbine 13, and the exhaust chamber 30. An end portion of the rotor 32 on the compressor 11 side is rotatably supported by a bearing portion 33, and an end portion of the rotor 32 on the exhaust chamber 30 side is rotatably supported by a bearing portion 34. A plurality of discs on which the blades 24 are mounted and anchored in a row to the rotor 32 in the compressor 11, a plurality of discs on which the blades 28 are mounted and anchored in a row thereto in the turbine 13, and the end portion of the rotor 32 on the exhaust chamber 30 side is connected to a drive shaft of a power generator not illustrated in the drawings.

In the gas turbine 10, the compressor casing 21 of the compressor 11 is supported by a leg 35, the turbine casing 26 of the turbine 13 is supported by a leg 36, and the exhaust chamber 30 is supported by a leg 37.

Accordingly, air taken in through the air inlet port 20 of the compressor 11 passes through the inlet guide vane 22 and the plurality of vanes 23 and blades 24 and is compressed into high-temperature, high-pressure compressed air. A predetermined fuel is supplied into the compressed air in the combustor 12 and combusted. The high-temperature, high-pressure combustion gas, which is working fluid, produced by the combustor 12 passes through the plurality of vanes 27 and blades 28 making up the turbine 13 and drives the rotation of the rotor 32 and, in turn, drives the power generator connected to the rotor 32. On the other hand, the combustion gas that has driven the turbine 13 is released to the atmosphere as exhaust gas.

Figure 2:
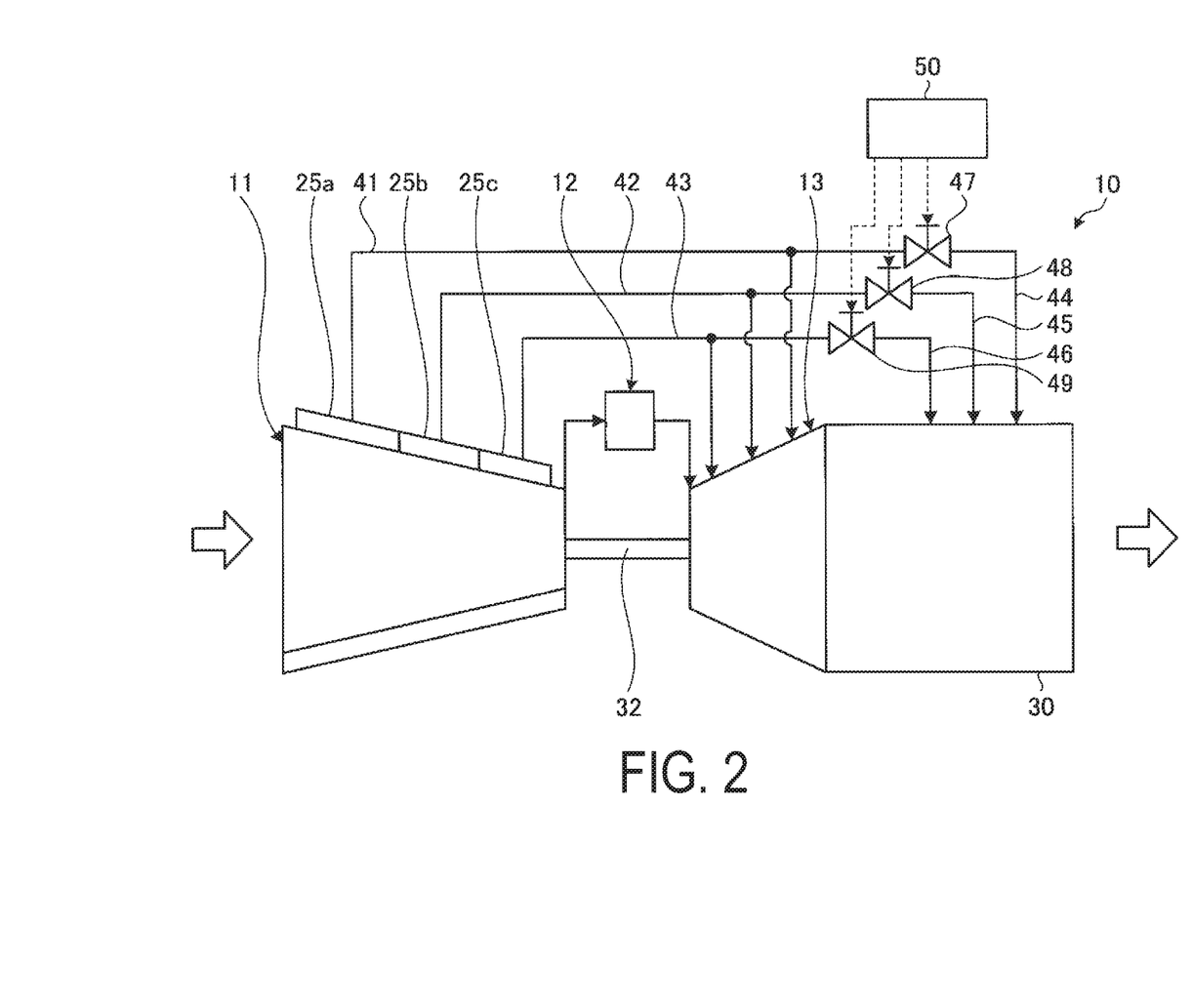
FIG. 2 is a schematic diagram of an air extraction pipe of the gas turbine of the present embodiment.

In the gas turbine 10 having such a configuration, as illustrated in FIG. 2, part of the compressed air bled from the compressor 11 is supplied as cooling air to the turbine 13 to cool the turbine 13. In other words, the cooling air (compressed air) bled from the air bleed chamber 25 (25a, 25b, 25c) of the compressor 11 is supplied to the turbine casing 26 of the turbine 13 to cool the vanes 27 and structural components that support the vanes 27.

The compressor casing 21 is provided with a low-pressure air bleed chamber (first air bleed chamber) 25a, a medium-pressure air bleed chamber (second air bleed chamber) 25b, and a high-pressure air bleed chamber (third air bleed chamber) 25c. A first end portion of a low-pressure air bleed flow path (first air bleed flow path) 41 is connected to the low-pressure air bleed chamber 25a, and a second end portion thereof is connected to a downstream portion of the turbine casing 26. A first end portion of a medium-pressure air bleed flow path (second air bleed flow path) 42 is connected to the medium-pressure air bleed chamber 25b, and a second end portion thereof is connected to a midstream portion of the turbine casing 26. A first end portion of a high-pressure air bleed flow path (third air bleed flow path) 43 is connected to the high-pressure air bleed chamber 25c, and a second end portion thereof is connected to an upstream portion of the turbine casing 26.

In the present embodiment, the compressor 11 has 15 stages and includes 15 vanes 23 and 15 blades 24 alternately disposed with respect to the axial direction of the rotor 32. For example, the low-pressure air bleed chamber 25a is provided with respect to the first stage to the sixth stage, the medium-pressure air bleed chamber 25b is provided to the seventh stage to the ninth stage, and the high-pressure air bleed chamber 25c is provided to the tenth stage to the twelfth stage.

However, the present embodiment is not limited to this configuration. For example, the high-pressure air bleed chamber 25c may be provided to any stages upstream from the fifteenth stage, i.e., the final stage, from the eleventh stage to the fourteenth stage, and the high-pressure air bleed chamber 25c may be configured to extract compressed air in the position of any stages from the eleventh stage to the fourteenth stage. The compressor 11 is not limited to a compressor having 15 stages and may be a compressor having 17 stages or more. For example, in case of having 17 stages, the compressor 11 includes 17 vanes 23 and 17 blades 24 alternately disposed with respect to the axial direction of the rotor 32. For example, the low-pressure air bleed chamber 25a may be provided to the first stage to the sixth stage, the medium-pressure air bleed chamber 25b may be provided to the seventh stage to the eleventh stage, and the high-pressure air bleed chamber 25c may be provided to the twelfth stage to the fourteenth stage. With respect to the total number of stages of the compressor, the low-pressure air bleed chamber 25a may be configured to correspond to the stages within a range of 30 to 45% from the front stage, the medium-pressure air bleed chamber 25b may be configured to correspond to the stages within a range of 55 to 70% from the front stage, and the high-pressure air bleed chamber 25c may be configured to correspond to the stages within a range of 75 to 95% from the front stage.

A first end portion of a low-pressure exhaust flow path (first exhaust flow path) 44 is connected to a halfway portion of the low-pressure air bleed flow path 41, and a second end portion thereof is connected to the exhaust chamber 30 (or an exhaust duct). A first end portion of a medium-pressure exhaust flow path (second exhaust flow path) 45 is connected to a halfway portion of the medium-pressure air bleed flow path 42, and a second end portion thereof is connected to the exhaust chamber 30 (or an exhaust duct). A first end portion of a high-pressure exhaust flow path (third exhaust flow path) 46 is connected to a halfway portion of the high-pressure air bleed flow path 43, and a second end portion thereof is connected to the exhaust chamber 30 (or an exhaust duct). A low-pressure exhaust valve (first exhaust valve) 47 is provided in the low-pressure exhaust flow path 44. A medium-pressure exhaust valve (second exhaust valve) 48 is provided in the medium-pressure exhaust flow path 45. A high-pressure exhaust valve (third exhaust valve) 49 is provided in the high-pressure exhaust flow path 46.

Thus, when the low-pressure exhaust valve 47 is closed, low-pressure compressed air bled from the low-pressure air bleed chamber 25a passes through the low-pressure air bleed flow path 41 and is supplied to the downstream side of the turbine casing 26. On the other hand, when the low-pressure exhaust valve 47 is opened, low-pressure compressed air bled from the low-pressure air bleed chamber 25a passes through the low-pressure exhaust flow path 44 and is discharged into the exhaust chamber 30. When the medium-pressure exhaust valve 48 is closed, medium-pressure compressed air bled from the medium-pressure air bleed chamber 25b passes through the medium-pressure air bleed flow path 42 and is supplied to the midstream side of the turbine casing 26. On the other hand, when the medium-pressure exhaust valve 48 is opened, medium-pressure compressed air bled from the medium-pressure air bleed chamber 25b passes through the medium-pressure exhaust flow path 45 and is discharged into the exhaust chamber 30. When the high-pressure exhaust valve 49 is closed, high-pressure compressed air bled from the high-pressure air bleed chamber 25c passes through the high-pressure air bleed flow path 43 and is supplied to the upstream side of the turbine casing 26. On the other hand, when the high-pressure exhaust valve 49 is opened, high-pressure compressed air bled from the high-pressure air bleed chamber 25c passes through the high-pressure exhaust flow path 46 and is discharged into the exhaust chamber 30.

The low-pressure exhaust valve 47, the medium-pressure exhaust valve 48, and the high-pressure exhaust valve 49 are flow rate regulating valves. A control device 50 can control the opening and closing of the low-pressure exhaust valve 47, the medium-pressure exhaust valve 48, and the high-pressure exhaust valve 49. The control device 50 can also adjust a degree of opening of the low-pressure exhaust valve 47, the medium-pressure exhaust valve 48, and the high-pressure exhaust valve 49. In a case that a degree of opening of the low-pressure exhaust valve 47, the medium-pressure exhaust valve 48, and the high-pressure exhaust valve 49 does not need to be adjusted, the low-pressure exhaust valve 47, the medium-pressure exhaust valve 48, and the high-pressure exhaust valve 49 may be on-off valves.

When the gas turbine 10 starts up, the rotation of the rotor 32 is driven by a startup motor (for example, a motor generator used as a generator) to drive the compressor 11 in order to secure compressed air. When the compressed air is produced by this compressor 11, the load on the blades 24 increases and revolution stall may occur. Particularly, when a pressure ratio increases due to increase in performance of the gas turbine 10, revolution stall is more likely to occur.

Thus, a method for starting up a gas turbine in the present embodiment includes opening the high-pressure exhaust valve 49 before a startup state of the gas turbine 10 reaches a region in which revolution stall occurs when the gas turbine 10 starts up. The method for starting up a gas turbine in the present embodiment also includes opening the low-pressure exhaust valve 47, the medium-pressure exhaust valve 48, and the high-pressure exhaust valve 49 before the startup state of the gas turbine 10 reaches the region in which revolution stall occurs when the gas turbine 10 starts up.

A device for starting up a gas turbine in the present embodiment includes the control device 50. This control device 50 opens (controls a degree of opening of) the low-pressure exhaust valve 47, the medium-pressure exhaust valve 48, and the high-pressure exhaust valve 49 before the startup state of the gas turbine 10 reaches the region in which revolution stall occurs. In this case, the control device 50 opens the low-pressure exhaust valve 47, the medium-pressure exhaust valve 48, and the high-pressure exhaust valve 49 before the gas turbine 10 starts up, and starts up the gas turbine 10 by causing the startup motor to drive the rotation of the rotor 32.

The degree of opening of the low-pressure exhaust valve 47 and the medium-pressure exhaust valve 48 upon the startup of the gas turbine 10 is the maximum opening (100%) or close to the maximum opening. The degree of opening of the high-pressure exhaust valve 49 upon the startup of the gas turbine 10 is less than the degree of opening of the low-pressure exhaust valve 47 and the medium-pressure exhaust valve 48. For example, the degree of opening of the high-pressure exhaust valve 49 is close to half opening (from 40% to 50%).

The method for starting up a gas turbine in the present embodiment includes closing the low-pressure exhaust valve 47, the medium-pressure exhaust valve 48, and the high-pressure exhaust valve 49 after the startup state of the gas turbine 10 passes through the region in which revolution stall occurs.

Specifically, the high-pressure exhaust valve 49 is closed when the rotational speed of the gas turbine 10 (compressor 11) reaches a predetermined first rotational speed that is preset. The low-pressure exhaust valve 47 is closed when the rotational speed of the gas turbine 10 reaches a predetermined second rotational speed that is preset higher than the first rotational speed. The medium-pressure exhaust valve 48 is closed when the rotational speed of the gas turbine 10 reaches a predetermined third rotational speed that is preset higher than the second rotational speed.

Because the first rotational speed, second rotational speed, and the third rotational speed vary by model of the gas turbine 10, the rotational speed is preset by experiment or the like. In this case, the degree of opening of the low-pressure exhaust valve 47 and the medium-pressure exhaust valve 48 upon the startup of the gas turbine 10 is close to the maximum opening, as described above. However, the degree of opening of the high-pressure exhaust valve 49 upon the startup of the gas turbine 10 is set according to an inlet gas temperature or an outlet gas temperature of the turbine 13 and the pressure of the compressed air in the compressor 11.

When the gas turbine 10 starts up and the rotational speed of the compressor 11 increases, the temperature of the combustion gas (exhaust gas) that flows into the turbine 13 increases and the turbine 13 is heated. Accordingly, part of the compressed air produced by the compressor 11 needs to be extracted and supplied as cooling air to the turbine 13 through each of the air bleed paths 41, 42, 43 to cool the turbine 13. The degree of opening of the high-pressure exhaust valve 49 is thus limited. That is to say, an upper limit value of the degree of opening of the high-pressure exhaust valve 49 is set according to the inlet gas temperature (outlet gas temperature) of the turbine 13. In other words, the upper limit value of the degree of opening of the high-pressure exhaust valve 49 is determined so as not to increase the inlet gas temperature of the turbine 13 to higher than a heatproof temperature.

On the other hand, when the rotational speed of the compressor 11 increases, the load on the blades 24 increases and revolution stall may occur, as described above. Accordingly, the pressure of the compressed air in the compressor 11 needs to be reduced by extracting and discharging the compressed air. The degree of opening of the high-pressure exhaust valve 49 is thus limited. That is to say, a lower limit value of the degree of opening of the high-pressure exhaust valve 49 is set according to the pressure of the compressed air in the compressor 11. In other words, the lower limit value of the high-pressure exhaust valve 49 is determined so as to suppress the occurrence of revolution stall in the compressor 11.

Figure 3:
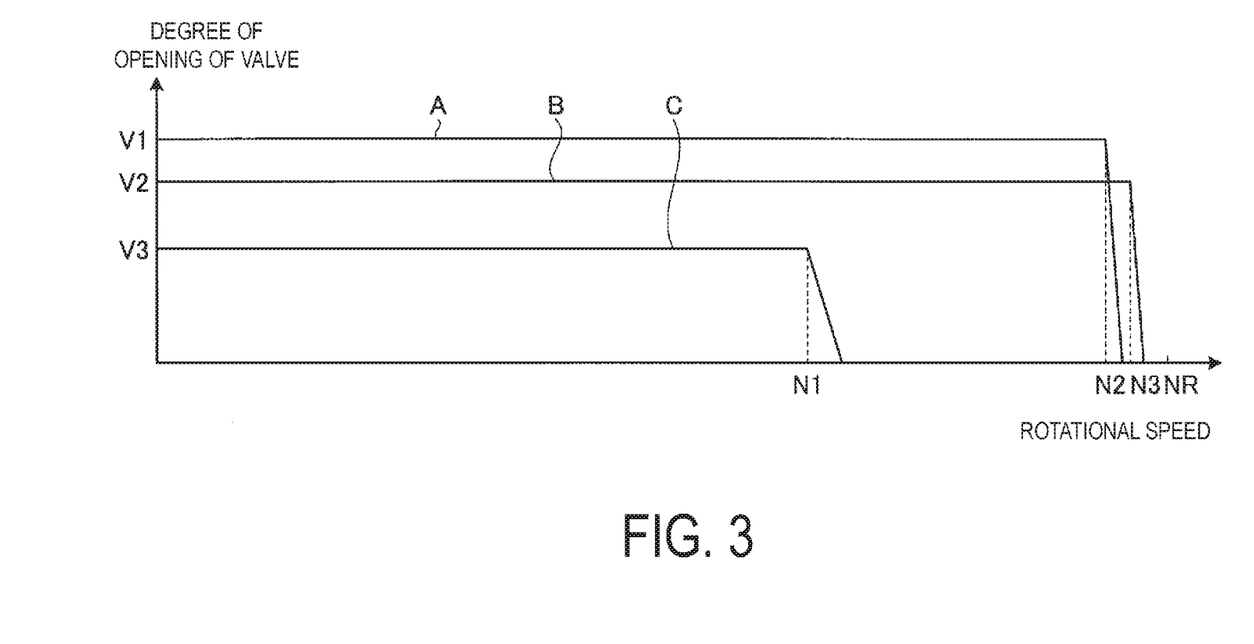
FIG. 3 is a graph showing a degree of opening of exhaust valves upon startup of the gas turbine.

Herein, control of the opening and closing of each of the exhaust valves 47, 48, 49 by the control device 50 upon the startup of the gas turbine 10 is described specifically. FIG. 3 is a graph showing the degree of opening of the exhaust valves upon the startup of the gas turbine.

As shown in FIG. 3, a degree of opening A of the low-pressure exhaust valve 47 is set at V1, a degree of opening B of the medium-pressure exhaust valve 48 is set at V2, and a degree of opening C of the high-pressure exhaust valve 49 is set at V3, upon the startup of the gas turbine 10. In this state, the startup motor drives the compressor 11. At this time, the degree of opening of the low-pressure exhaust valve 47 and the medium-pressure exhaust valve 48 is close to the maximum opening (100%) and the degree of opening of the high-pressure exhaust valve 49 is close to half opening (from 40% to 50%).

When the gas turbine 10 starts up, the rotational speed of the compressor 11 increases, the compressed air is produced, and pressure of the compressed air increases. Accordingly, the load on the blades 24 increases and revolution stall may occur. However, air is bled from the low-pressure side, the medium-pressure side, and the high-pressure side of the compressor 11 herein, so that an increase in the pressure is suppressed especially on the high-pressure side. Thus, the load acting on the blades 24 decreases and the occurrence of revolution stall is suppressed.

In this case, in a case where air is bled only from the low-pressure side and the medium-pressure side of the compressor 11, compressed air having a high density is extracted, and the air bleed flow paths (pipes) 41, 42 and exhaust flow paths (pipes) 44, 45 having a large diameter are needed. Furthermore, the compressed air extracted from the low-pressure side and the medium-pressure side of the compressor 11 is not at high pressure, so that a pressure differential between the turbine 13 side and the low-pressure and medium-pressure sides is small. This makes it difficult to adjust an amount of extraction, possibly resulting in an adverse effect on startup performance. However, air is also bled from the high-pressure side of the compressor 11 in addition to the low-pressure side and the medium-pressure side thereof herein. Thus, an increase in diameter of the air bleed flow paths (pipes) 41, 42, 43 and exhaust flow paths (pipes) 44, 45, 46 and deterioration in the startup performance can be suppressed. The volume of a thyristor can be reduced. In particular, by extracting the compressed air immediately before the final stage at the highest pressure that is choked, a pressure ratio on the front stage side is effectively reduced and the startup performance can be improved.

When the gas turbine 10 starts up, the rotational speed increases. When the rotational speed reaches a first rotational speed N1, the high-pressure exhaust valve 49 is closed. Subsequently, when the rotational speed of the gas turbine 10 increases and reaches a second rotational speed N2, the low-pressure exhaust valve 47 is closed. After that, when the rotational speed of the gas turbine 10 increases and reaches a third rotational speed N3, the medium-pressure exhaust valve 48 is closed. In other words, after the startup state of the gas turbine 10 passes through the region in which revolution stall occurs, the high-pressure exhaust valve 49, the low-pressure exhaust valve 47, and the medium-pressure exhaust valve 48 are closed in the stated order.

Figure 4:
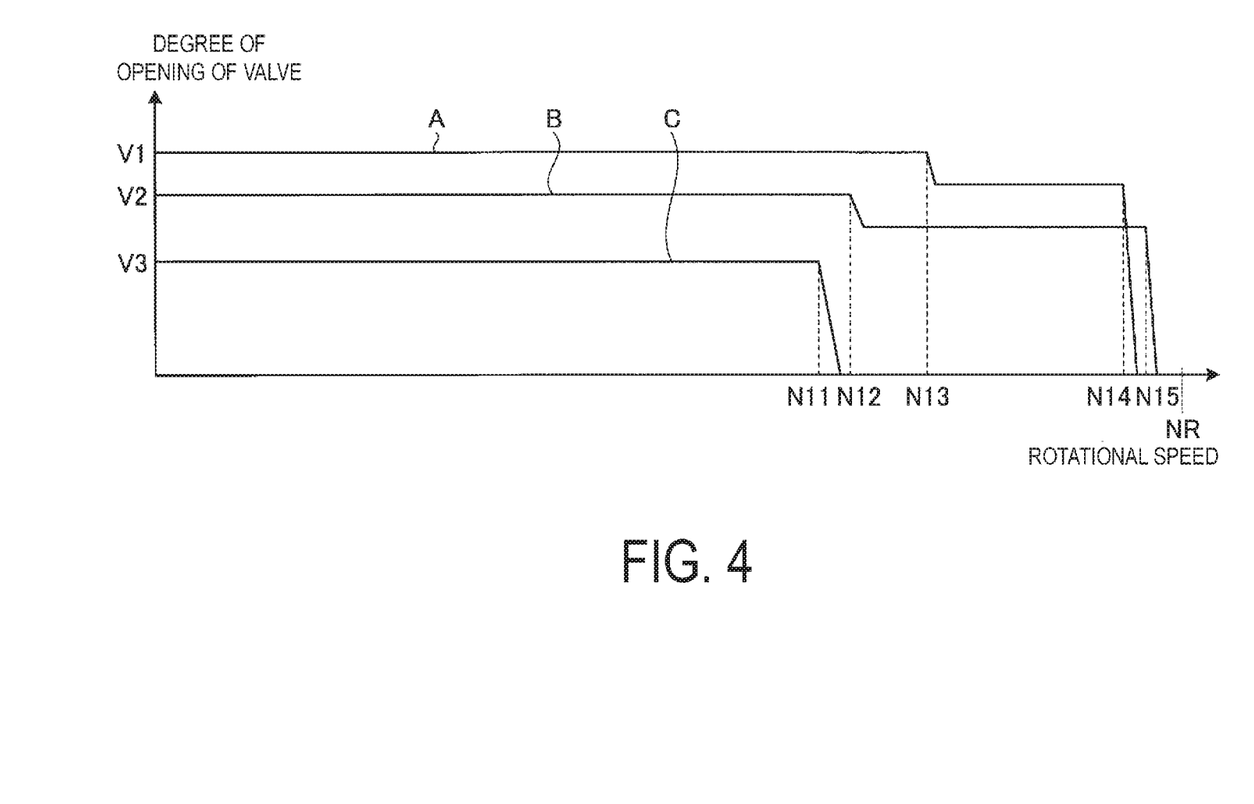
FIG. 4 is a graph showing a degree of opening of exhaust valves upon the startup of the gas turbine of a modified example.
Figure 5:
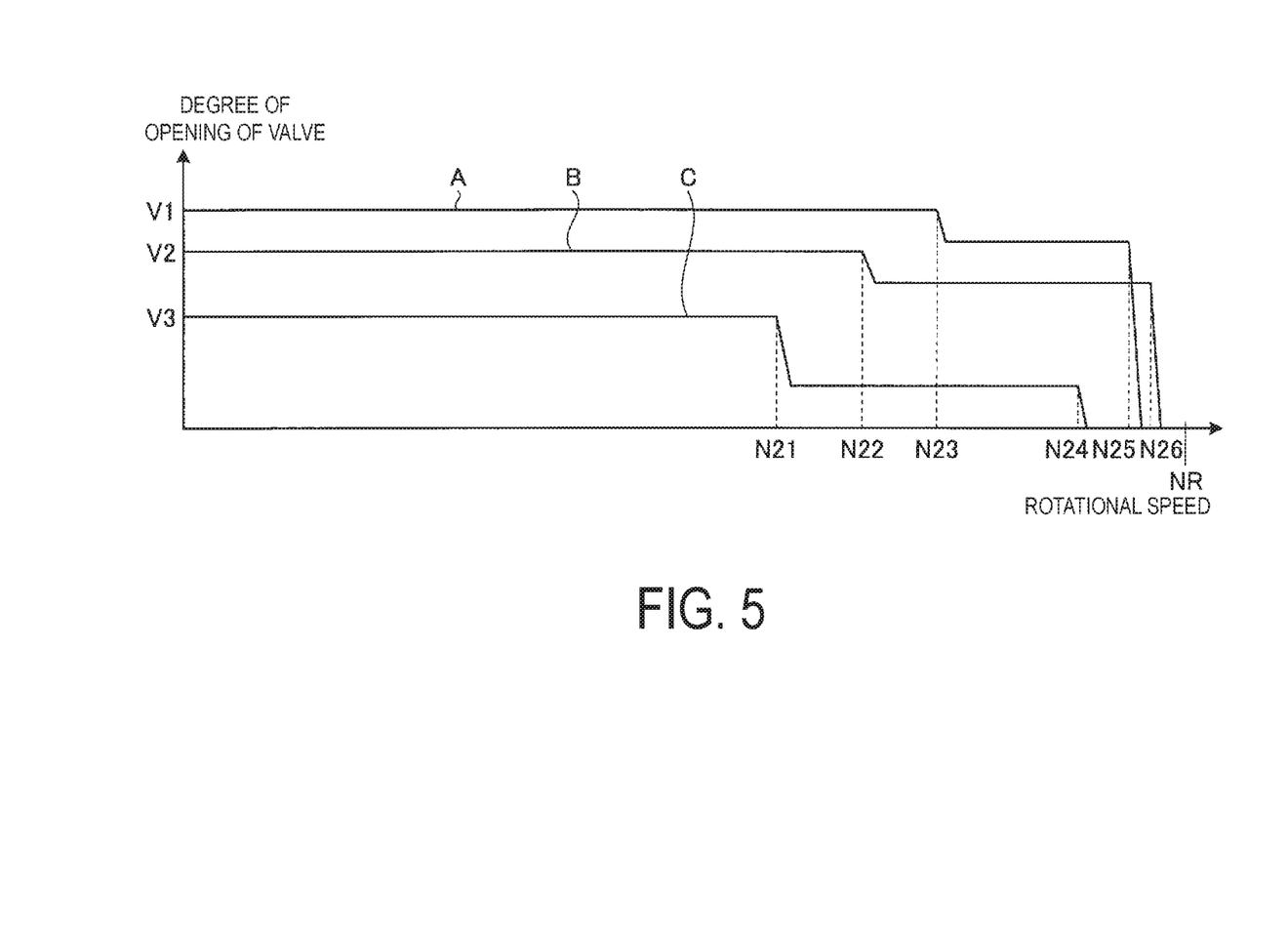
FIG. 5 is a graph showing a degree of opening of exhaust valves upon the startup of the gas turbine of another modified example.

Note that the high-pressure exhaust valve 49, the low-pressure exhaust valve 47, and the medium-pressure exhaust valve 48 are closed in the stated order according to the rotational speed of the gas turbine 10, but the present embodiment is not limited to this configuration. FIG. 4 and FIG. 5 are graphs showing the degree of opening of exhaust valves upon startup of the gas turbine of modified examples.

In one of the modified examples, the degree of opening of the low-pressure exhaust valve 47 and the medium-pressure exhaust valve 48 is reduced over a predetermined period according to the rotational speed of the gas turbine 10. Then, the low-pressure exhaust valve 47 and the medium-pressure exhaust valve 48 are closed. As shown in FIG. 4, a degree of opening A of the low-pressure exhaust valve 47 is set at V1, a degree of opening B of the medium-pressure exhaust valve 48 is set at V2, and a degree of opening C of the high-pressure exhaust valve 49 is set to V3, upon the startup of the gas turbine 10. In this state, the startup motor drives the compressor 11.

When the rotational speed of the gas turbine 10 increases and reaches a first rotational speed N11, the high-pressure exhaust valve 49 is closed. Subsequently, when the rotational speed of the gas turbine 10 increases and reaches a predetermined rotational speed N12, the degree of opening of the medium-pressure exhaust valve 48 is reduced. When the rotational speed of the gas turbine 10 reaches a predetermined rotational speed N13, the degree of opening of the low-pressure exhaust valve 47 is reduced. After that, when the rotational speed of the gas turbine 10 increases and reaches a second rotational speed N14, the low-pressure exhaust valve 47 is closed. When the rotational speed of the gas turbine 10 reaches a third rotational speed N15, the medium-pressure exhaust valve 48 is closed. In other words, after the startup state of the gas turbine 10 passes through the region in which revolution stall occurs, the high-pressure exhaust valve 49 is closed and the degree of opening of the low-pressure exhaust valve 47 and the medium-pressure exhaust valve 48 is reduced. This can reduce an amount of extraction from the compressor 11 and promptly increase pressure of the compressed air.

In the other modified example, the degree of opening of the high-pressure exhaust valve 49 is reduced when the rotational speed of the gas turbine 10 reaches a predetermined fourth rotational speed that is preset lower than a first rotational speed. The high-pressure exhaust valve 49 is closed when the rotational speed of the gas turbine 10 reaches the first rotational speed. As shown in FIG. 5, a degree of opening A of the low-pressure exhaust valve 47 is set at V1, a degree of opening B of the medium-pressure exhaust valve 48 is set at V2, and a degree of opening C of the high-pressure exhaust valve 49 is set at V3, upon the startup of the gas turbine 10. In this state, the startup motor drives the compressor 11.

When the rotational speed of the gas turbine 10 increases and reaches a fourth rotational speed N21, the degree of opening of the high-pressure exhaust valve 49 is reduced. When the rotational speed of the gas turbine 10 increases and reaches a predetermined rotational speed N22, the degree of opening of the medium-pressure exhaust valve 48 is reduced. When the rotational speed of the gas turbine 10 reaches a predetermined rotational speed N23, the degree of opening of the low-pressure exhaust valve 47 is reduced. After that, when the rotational speed of the gas turbine 10 increases and reaches a first rotational speed N24, the high-pressure exhaust valve 49 is closed. When the rotational speed of the gas turbine 10 reaches a second rotational speed N25, the low-pressure exhaust valve 47 is closed. When the rotational speed of the gas turbine 10 reaches a third rotational speed N26, the medium-pressure exhaust valve 48 is closed. In other words, after the startup state of the gas turbine 10 passes through the region in which revolution stall occurs, the degree of opening of the high-pressure exhaust valve 49 is reduced without closing the high-pressure exhaust valve 49 so as to be prepared for the occurrence of revolution stall. When the rotational speed of the gas turbine 10 reaches the first rotational speed N24 where revolution stall rarely occurs, the high-pressure exhaust valve 29 is closed.

In this way, in the method for starting up a gas turbine in the present embodiment, the low-pressure air bleed flow path 41, the medium-pressure air bleed flow path 42, and the high-pressure air bleed flow path 43 for supplying, as cooling air, compressed air bled from the low-pressure air bleed chamber 25*a*, the medium-pressure air bleed chamber 25*b*, and the high-pressure air bleed chamber 25*c* of the compressor 11 to the turbine 13 are provided. The low-pressure exhaust flow path 44, the medium-pressure exhaust flow path 45, and the high-pressure exhaust flow path 46 for discharging the compressed air in the low-pressure air bleed flow path 41, the medium-pressure air bleed flow path 42, and the high-pressure air bleed flow path 43 to a turbine exhaust system are provided. The low-pressure exhaust valve 47, the medium-pressure exhaust valve 48, and the high-pressure exhaust valve 49 are provided in the low-pressure exhaust flow path 44, the medium-pressure exhaust flow path 45, and the high-pressure exhaust flow path 46, respectively. When the gas turbine 10 starts up, the high-pressure exhaust valve 49 is opened before the startup state of the gas turbine 10 reaches the region in which revolution stall occurs.

Therefore, when the gas turbine 10 starts up, the startup motor drives the compressor 11 to compress air and the compressed air flows to the combustor 12 side, for example. At this time, the load on the blades 24 in the compressor 11 increases, and revolution stall may occur. Thus, the high-pressure exhaust valve 49 is opened before the startup state of the gas turbine 10 reaches the region in which revolution stall occurs. The compressed air that is bled from the high-pressure air bleed chamber 25*c* and flows through the high-pressure air bleed flow path 43 is discharged into a turbine exhaust system through the high-pressure exhaust flow path 46. This reduces the load on the blades 24 and suppresses the occurrence of revolution stall, so that the startup performance of the gas turbine 10 can be improved. As a result, the gas turbine 10 can appropriately start up while suppressing an increase in structural complexity and in manufacturing costs.

In the method for starting up a gas turbine in the present embodiment, the low-pressure exhaust valve 47, the medium-pressure exhaust valve 48, and the high-pressure exhaust valve 49 are opened before the startup state of the gas turbine 10 reaches the region in which revolution stall occurs when the gas turbine 10 starts up. Therefore, not only the high-pressure exhaust valve 49 but also the low-pressure exhaust valve 47 and the medium-pressure exhaust valve 48 are opened. Thus, the load on the blades 24 in all the regions of the compressor 11 can be reduced and the occurrence of revolution stall is suppressed. This can improve the startup performance of the gas turbine 10.

In the method for starting up a gas turbine in the present embodiment, the low-pressure exhaust valve 47, the medium-pressure exhaust valve 48, and the high-pressure exhaust valve 49 are opened when the gas turbine 10 starts up. Therefore, each of the exhaust valves 47, 48, 49 is opened before the startup of the gas turbine 10. This eliminates the operation to open valves in the middle of the startup of the gas turbine 10, and operability can be improved by simplifying the control.

In the method for starting up a gas turbine in the present embodiment, the degree of opening of the high-pressure exhaust valve 49 is set smaller than the degree of opening of the low-pressure exhaust valve 47 and the medium-pressure exhaust valve 48. Therefore, a loss of the compressed air pressurized to high pressure is suppressed, and a decrease in turbine efficiency can be suppressed.

In the method for starting up a gas turbine in the present embodiment, the low-pressure exhaust valve 47, the medium-pressure exhaust valve 48, and the high-pressure exhaust valve 49 are closed after the startup state of the gas turbine 10 passes through the region in which revolution stall occurs. Therefore, a sufficient amount of the compressed air is secured, and a rated operation can be performed in an early stage.

In the method for starting up a gas turbine in the present embodiment, the high-pressure exhaust valve 49 is closed when the rotational speed of the gas turbine 10 reaches a predetermined first rotational speed that is preset. Therefore, when the rotational speed increases, the high-pressure exhaust valve 49 is first closed. Thus, extraction of the compressed air pressurized to high pressure is stopped, and a rated operation can be performed in an early stage.

In the method for starting up a gas turbine in the present embodiment, the low-pressure exhaust valve 47 is closed when the rotational speed of the gas turbine 10 reaches a predetermined second rotational speed that is preset higher than the first rotational speed. The medium-pressure exhaust valve 48 is closed when the rotational speed of the gas turbine 10 reaches a predetermined third rotational speed that is preset higher than the second rotational speed. Therefore, extraction of the compressed air is successively stopped, and a rated operation can be performed in an early stage.

In the method for starting up a gas turbine in the present embodiment, the degree of opening of the high-pressure exhaust valve 49 is reduced when the rotational speed of the gas turbine 10 reaches a predetermined fourth rotational speed that is preset lower than a first rotational speed. The high-pressure exhaust valve 49 is closed when the rotational speed of the gas turbine 10 reaches the first rotational speed. Therefore, a loss of the compressed air pressurized to high pressure is suppressed, and a decrease in turbine efficiency can be suppressed.

In the method for starting up a gas turbine in the present embodiment, an upper limit value of the degree of opening of the high-pressure exhaust valve 49 upon the startup of the gas turbine 10 is set according to an inlet gas temperature or an outlet gas temperature of the turbine 13. Therefore, an increase in temperature to higher than a heatproof temperature in the compressor 11 is prevented, and safety can be secured.

In the method for starting up a gas turbine in the present embodiment, a lower limit value of the degree of opening of the high-pressure exhaust valve 49 upon the startup of the gas turbine 10 is set according to pressure of the compressed air in the compressor 11. Therefore, a wasteful loss of compressed air can be suppressed while suppressing the occurrence of revolution stall.

The device for starting up a gas turbine in the present embodiment is provided with the low-pressure air bleed flow path 41, the medium-pressure air bleed flow path 42, the high-pressure air bleed flow path 43, the low-pressure exhaust flow path 44, the medium-pressure exhaust flow path 45, the high-pressure exhaust flow path 46, the low-pressure exhaust valve 47, the medium-pressure exhaust valve 48, the high-pressure exhaust valve 49, and the control device 50. The low-pressure air bleed flow path 41, the medium-pressure air bleed flow path 42, and the high-pressure air bleed flow path 43 supply, as cooling air, compressed air bled from the low-pressure air bleed chamber 25a, the medium-pressure air bleed chamber 25b, and the high-pressure air bleed chamber 25c of the compressor 11 to the turbine 13. The low-pressure exhaust flow path 44, the medium-pressure exhaust flow path 45, and the high-pressure exhaust flow path 46 discharge the compressed air in the low-pressure air bleed flow path 41, the medium-pressure air bleed flow path 42, and the high-pressure air bleed flow path 43 to a turbine exhaust system. The low-pressure exhaust valve 47, the medium-pressure exhaust valve 48, and the high-pressure exhaust valve 49 are provided in the low-pressure exhaust flow path 44, the medium-pressure exhaust flow path 45, and the high-pressure exhaust flow path 46, respectively. The control device 50 opens the high-pressure exhaust valve 49 before the startup state of the gas turbine 10 reaches the region in which revolution stall occurs when the gas turbine 10 starts up.

Therefore, when the gas turbine 10 starts up, the high-pressure exhaust valve 49 is opened before the startup state of the gas turbine 10 reaches the region in which revolution stall occurs. Thus, the load on the blades 24 is reduced and the occurrence of revolution stall is suppressed. This can improve the startup performance of the gas turbine 10. As a result, the gas turbine 10 can appropriately start up while suppressing an increase in structural complexity and in manufacturing costs.

In the method for starting up a gas turbine in the present embodiment, the low-pressure air bleed flow path 41, the medium-pressure air bleed flow path 42, and the high-pressure air bleed flow path 43 for supplying, as cooling air, compressed air bled from the low-pressure air bleed chamber 25a, the medium-pressure air bleed chamber 25b, and the high-pressure air bleed chamber 25c of the compressor 11 to the turbine 13 are provided. The low-pressure exhaust flow path 44, the medium-pressure exhaust flow path 45, and the high-pressure exhaust flow path 46 for discharging the compressed air in the low-pressure air bleed flow path 41, the medium-pressure air bleed flow path 42, and the high-pressure air bleed flow path 43 to a turbine exhaust system are provided. The low-pressure exhaust valve 47, the medium-pressure exhaust valve 48, and the high-pressure exhaust valve 49 are provided in the low-pressure exhaust flow path 44, the medium-pressure exhaust flow path 45, and the high-pressure exhaust flow path 46, respectively. The degree of opening of the low-pressure exhaust valve 47, the medium-pressure exhaust valve 48, and the high-pressure exhaust valve 49 is increased before the startup state of the gas turbine 10 reaches the region in which revolution stall occurs. The degree of opening of the low-pressure exhaust valve 47, the medium-pressure exhaust valve 48, and the high-pressure exhaust valve 49 is reduced after the startup state of the gas turbine 10 passes through the region in which revolution stall occurs.

Therefore, when the gas turbine 10 starts up, the startup motor drives the compressor 11 to compress air and the compressed air flows to the combustor 12 side, for example. At this time, a load on the blades 24 in the compressor 11 increases, and revolution stall may occur. Thus, the degree of opening of the exhaust valves 47, 48, 49 is increased before the startup state of the gas turbine 10 reaches the region in which revolution stall occurs, and the degree of opening of the exhaust valves 47, 48, 49 is reduced after the startup state of the gas turbine 10 passes through the region in which revolution stall occurs. This reduces the load on the blades 24 and suppresses the occurrence of revolution stall, so that the startup performance of the gas turbine 10 can be improved. As a result, the gas turbine 10 can appropriately start up while suppressing an increase in structural complexity and in manufacturing costs.

Note that in the method and device for starting up a gas turbine of the present invention, exhaust valves are opened before a startup state of the gas turbine reaches a region in which revolution stall occurs when the gas turbine starts up. In the present embodiment, when the gas turbine 10 starts up, that is to say, before the gas turbine 10 starts up, the exhaust valves are configured to be opened, but the present invention is not limited to this configuration. For example, rotational speed and pressure of compressed air in which revolution stall of a gas turbine occurs may be obtained by experiment or the like in advance, and when the gas turbine starts up and the rotational speed and the pressure of the compressed air in which revolution stall occurs are reached, exhaust valves may be opened.

REFERENCE SIGNS LIST

11 Compressor
12 Combustor
13 Turbine
21 Compressor casing
23 Vane
24 Blade
25 Air bleed chamber
25a Low-pressure air bleed chamber (first air bleed chamber)
25b Medium-pressure air bleed chamber (second air bleed chamber)
25c High-pressure air bleed chamber (third air bleed chamber)
26 Turbine casing
30 Exhaust chamber
32 Rotor
41 Low-pressure air bleed flow path (first air bleed flow path)
42 Medium-pressure air bleed flow path (second air bleed flow path)
43 High-pressure air bleed flow path (third air bleed flow path)
44 Low-pressure exhaust flow path (first exhaust flow path)
45 Medium-pressure exhaust flow path (second exhaust flow path)
46 High-pressure exhaust flow path (third exhaust flow path)
47 Low-pressure exhaust valve (first exhaust valve)
48 Medium-pressure exhaust valve (second exhaust valve)
49 High-pressure exhaust valve (third exhaust valve)
50 Control device

The invention claimed is:

1. A method for starting up a gas turbine,
the gas turbine including a compressor, a combustor, and a turbine,
the gas turbine being provided with
a first air bleed flow path, a second air bleed flow path, and a third air bleed flow path for supplying, as cooling air, compressed air bled from a first air bleed chamber, a second air bleed chamber on a higher pressure side than the first air bleed chamber, and a third air bleed chamber on a higher pressure side than the second air bleed chamber of the compressor to the turbine,
a first exhaust flow path, a second exhaust flow path, and a third exhaust flow path for discharging the compressed air in the first air bleed flow path, the second air bleed flow path, and the third air bleed flow path to a turbine exhaust system, and
a first exhaust valve, a second exhaust valve, and a third exhaust valve in the first exhaust flow path, the second exhaust flow path, and the third exhaust flow path, respectively,
the method comprising:
when the gas turbine starts up, opening the first exhaust valve, the second exhaust valve, and the third exhaust valve before a startup state of the gas turbine reaches a region in which revolution stall occurs; and
starting closing the first exhaust valve, the second exhaust valve, and the third exhaust valve at different rotational speeds of the gas turbine and completing the closing of the respective valves at different rotational speeds of the gas turbine after the startup state of the gas turbine passes through the region in which revolution stall occurs,
wherein the rotational speed to start closing the third exhaust valve is lower than the rotational speeds to start closing the first exhaust valve and the second exhaust valve, and
the rotational speed to complete closing the third exhaust valve is lower than the rotational speeds to complete closing the first exhaust valve and the second exhaust valve.

2. The method for starting up a gas turbine according to claim 1, wherein the first air bleed chamber is provided to stages located within a range of 30% to 45% from a front stage of the compressor, the second air bleed chamber is provided to stages located within a range of 55% to 70% from the front stage, and the third air bleed chamber is provided to stages located within a range of 75% to 95% from the front stage.

3. The method for starting up a gas turbine according to claim 1, further comprising opening the first exhaust valve, the second exhaust valve, and the third exhaust valve upon startup of the gas turbine.

4. The method for starting up a gas turbine according to claim 1, wherein a degree of opening of the third exhaust valve is set smaller than a degree of opening of the first exhaust valve and the second exhaust valve.

5. The method for starting up a gas turbine according to claim 1, wherein the rotational speed to start closing the first exhaust valve is higher than the predetermined second rotational speed to start closing the second exhaust valve.

6. The method for starting up a gas turbine according to claim 1, further comprising reducing a degree of opening of the third exhaust valve when the rotational speed of the gas turbine reaches a rotational speed lower than the rotational speed to start closing the third exhaust valve, and starting closing the third exhaust valve when the rotational speed of the gas turbine reaches the rotational speed to start closing the third exhaust valve.

7. The method for starting up a gas turbine according to claim 1, wherein an upper limit value of a degree of opening of the third exhaust valve upon startup of the gas turbine is set according to an inlet gas temperature or an outlet gas temperature of the turbine.

8. The method for starting up a gas turbine according to claim 1, wherein a lower limit value of a degree of opening of the third exhaust valve upon startup of the gas turbine is set according to pressure of the compressed air in the compressor.

9. The method for starting up a gas turbine according to claim 1,
further comprising:
increasing a degree of opening of the first exhaust valve, the second exhaust valve, and the third exhaust valve before a startup state of the gas turbine reaches a region in which revolution stall occurs; and
reducing the degree of opening of the first exhaust valve, the second exhaust valve, and the third exhaust valve at different rotational speeds of the gas turbine after the startup state of the gas turbine passes through the region in which revolution stall occurs.

10. A device for starting up a gas turbine,
the gas turbine including a compressor, a combustor, and a turbine,
the gas turbine being provided with
a first air bleed flow path, a second air bleed flow path, and a third air bleed flow path for supplying, as cooling air, compressed air bled from a first air bleed chamber, a second air bleed chamber on a higher pressure side than the first air bleed chamber, and a third air bleed chamber on a higher pressure side than the second air bleed chamber of the compressor to the turbine, the device, comprising:

a first exhaust flow path, a second exhaust flow path, and a third exhaust flow path for discharging the compressed air in the first air bleed flow path, the second air bleed flow path, and the third air bleed flow path to a turbine exhaust system;

a first exhaust valve, a second exhaust valve, and a third exhaust valve in the first exhaust flow path, the second exhaust flow path, and the third exhaust flow path, respectively; and a control device that opens the first exhaust valve, the second exhaust valve, and the third exhaust valve before a startup state of the gas turbine reaches a region in which revolution stall occurs when the gas turbine starts up, and that closes the first exhaust valve, the second exhaust valve, and the third exhaust valve at different rotational speeds of the gas turbine after the startup state of the gas turbine passes through the region in which revolution stall occurs, wherein the rotational speed to start closing the third exhaust valve is lower than the rotational speeds to start closing the first exhaust valve and the second exhaust valve, and the rotational speed to complete closing the third exhaust valve is lower than the rotational speeds to complete closing the first exhaust valve and the second exhaust valve.

* * * * *